(12) United States Patent
Laughlin

(10) Patent No.: US 6,842,564 B2
(45) Date of Patent: Jan. 11, 2005

(54) REMOTELY CONFIGURABLE ADD/DROP FOR WAVELENGTH DIVISION MULTIPLEXING AND METHOD OF OPERATING THE SAME

(76) Inventor: Richard H. Laughlin, 5063 County Rd. 265, Collinsville, TX (US) 76233

( * ) Notice: Subject to any disclaimer, the term of this patent is extended or adjusted under 35 U.S.C. 154(b) by 56 days.

(21) Appl. No.: 10/224,830

(22) Filed: Aug. 21, 2002

(65) Prior Publication Data

US 2002/0191908 A1 Dec. 19, 2002

Related U.S. Application Data

(63) Continuation-in-part of application No. 09/826,455, filed on Apr. 5, 2001, now Pat. No. 6,665,461.

(51) Int. Cl.[7] .......................... G02B 6/293; G02B 6/32; G02B 6/35
(52) U.S. Cl. .............................. 385/24; 385/18; 385/33
(58) Field of Search .............................. 385/15–18, 24, 385/25, 31, 36, 37; 359/211, 222

(56) References Cited

U.S. PATENT DOCUMENTS

| | | | | |
|---|---|---|---|---|
| 4,449,782 A | * | 5/1984 | Korth | 385/24 |
| 5,234,772 A | * | 8/1993 | Oguchi et al. | 428/473.5 |
| 6,356,679 B1 | * | 3/2002 | Kapany | 385/18 |
| 6,463,192 B1 | * | 10/2002 | Kapany | 385/17 |

* cited by examiner

*Primary Examiner*—John D. Lee
*Assistant Examiner*—Sarah Song

(57) ABSTRACT

Novel architectures of integrated optical add/drop wavelength division multiplexers and FTIR switches are disclosed. In one embodiment, an add/drop includes: (1) a primary refracting body having a total internal reflecting surface and capable of transmitting optical energy therethrough, (2) a frustrating refracting body having a frustrating surface located proximate the total internal reflecting surface, (3) an actuator, coupled to the primary refracting body and the frustrating refracting body, that drives the frustrating refracting body thereby to frustrate a reflection of the total internal reflecting surface and (4) an optical filter, optically aligned with the primary refracting body, that configurably passes selected wavelengths of light through the primary refracting body and reflects remaining wavelengths.

10 Claims, 8 Drawing Sheets

REMOTELY CONFIGURABLE ADD/DROP FOR WAVELENGTH DIVISION MULTIPLEXING AND METHOD OF OPERATING THE SAME

CROSS-REFERENCE TO RELATED APPLICATION

The present application is a continuation-in-part of U.S. patent application Ser. No. 09/826,455, filed on Apr. 5, 2001 now U.S. Pat. No. 6,665,461 by Laughlin, entitled "Total Internal Reflection Optical Switch and Method of Operating the Same" and incorporated herein by reference.

TECHNICAL FIELD OF THE INVENTION

The present invention is directed, in general, to optical switches and, more specifically, to a remotely configurable add/drop for wavelength division multiplexing (WDM) and a method of operating the same.

BACKGROUND OF THE INVENTION

In today's rapidly expanding wavelength division multiplexing optical network, a critical need exists for a simple, low cost, reconfigurable wavelength division multiplexer having an add/drop capability (often referred to simply as an "add/drop"). Add/drops find use in a network having a number of communication nodes where one or more wavelengths may require temporarily added and or dropped at a specific node. To achieve this adding and dropping, the optical fibers interconnecting the network must be remotely configurable to add and drop the wavelengths as required.

Currently, several different technologies are used to provide wavelength division multiplexing and the adding and dropping of individual wavelengths. The earliest wavelength division multiplexing technology used hardwired adds and drops. These adds and drops were permanent; they always added or dropped the same specific wavelengths at a given node. This had the drawback of not being remotely configurable.

The newer techniques for remotely configurable add and drop wavelength division multiplexing first demultiplex the individual wavelengths in the beam and then re-multiplex the individual wavelengths into a combined signal. One or more discrete switches are then inserted in the demultiplexed signal to add and drop wavelengths. This has the drawback of being complex and requiring redundant components.

What is needed in the art is a remotely reconfigurable add/drop. What is further needed in the art is a method of operating such add/drop to add and/or drop particular wavelengths of light on command.

SUMMARY OF THE INVENTION

The present invention takes advantage of a frustrated total internal reflection (FTIR) optical switch included in the subject matter of the patent application incorporated herein by reference. It has been discovered that the FTIR switch can be augmented with an optical filter to effect reconfigurable WDM and thereby a wavelength-dependent add/drop function.

Accordingly, the present invention provides novel architectures of integrated optical add/drop wavelength division multiplexers and FTIR switches. In one embodiment, an add/drop includes: (1) a primary refracting body having a total internal reflecting surface and capable of transmitting optical energy therethrough, (2) a frustrating refracting body having a frustrating surface located proximate the total internal reflecting surface, (3) an actuator, coupled to the primary refracting body and the frustrating refracting body, that drives the frustrating refracting body thereby to frustrate a reflection of the total internal reflecting surface and (4) an optical filter, optically aligned with the primary refracting body, that configurably passes selected wavelengths of light through the primary refracting body and reflects remaining wavelengths.

In one embodiment of the present invention, the light encounters the optical filter before the frustrating refracting body (meaning that the optical filter is opposite the add/drop from the add/drop fibers). In an alternative embodiment, the light encounters the optical filter after the frustrating refracting body (meaning that the optical filter is adjacent the add/drop fibers). Though either alternative is possible, the former is slightly preferable, in that losses may be held to below 1 decibel for wavelengths passing through the add/drop.

In one embodiment of the present invention, the optical filter is actually coupled to the main refracting body. In another embodiment, the optical filter is composed of a dielectric material. Those skilled in the art will understand, however, that any appropriate material may be employed to construct a suitable bandpass, comb, shortpass or longpass filter, depending upon the desired filter function.

In one embodiment of the present invention, the primary refracting body is composed of glass. Those skilled in the pertinent art will realize, however, that the primary refracting body can be composed of any appropriate transparent material.

In one embodiment of the present invention, the frustrating refracting body is composed of glass. Those skilled in the pertinent art will realize, however, that the frustrating refracting body can be composed of any appropriate transparent material.

In one embodiment of the present invention, the actuator is composed of a piezoelectric bimorph. Alternatively, the actuator may be a mechanical structure of suitable speed and precision.

In one embodiment of the present invention, the add/drop further includes: (1) a first collimating lens optically aligned with the optical filter and (2) a first input fiber and a first output fiber coupled to the first collimating lens. In an embodiment to be illustrated and described, the add/drop further includes: (1) a first collimating lens optically aligned with the optical filter, (2) a second collimating lens coupled to a surface of the main refractive body, (3) a first input fiber and a first output fiber coupled to the first collimating lens and (4) a second input fiber and a second output fiber coupled to the second collimating lens.

In alternative embodiments of the present invention, the actuator drives the frustrating refracting body from the open state to the closed state or from the closed state to the open state. Thus, the add/drop may be normally open or normally closed. In the embodiment to be illustrated and described, the add/drop is normally open and driven closed.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
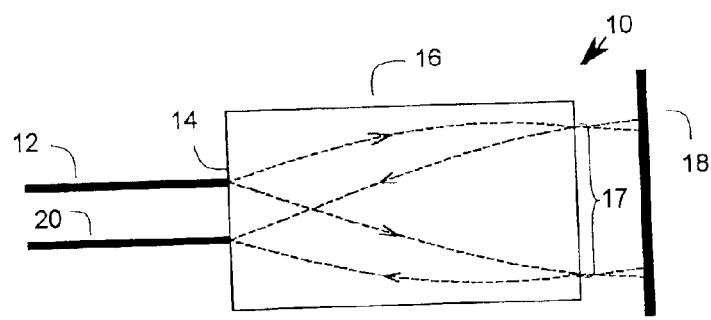
FIG. 1 illustrates an optical schematic of a prior art apparatus having a collimated beam from a lens reflected back upon itself.

Referring initially to FIG. 1, illustrated is an optical schematic of a prior art apparatus having a collimated beam from a lens reflected back upon itself. FIG. 1 is presented for the purpose of conveying basic optical principles of which the illustrated embodiment of the present invention takes advantage.

A first input fiber 12 provides a source of optical energy and terminates at a focal plane of a first collimating lens 16 that collimates the optical energy emanating from the first input fiber into a collimated beam 17. The first collimating lens 16 is illustrated as being a gradient index of refraction (GRIN) lens.

The collimated beam 17 impinges upon and is reflected from a mirror 18 at mutually dependent angles and returned to the first collimating lens 16. The first collimating lens 16 focuses the optical energy onto a first output fiber 20 terminating at the focal plane of the first collimating lens 16.

The first output fiber 20 serves as a receptor for the optical energy. By this process, the optical energy has been transferred from the first input fiber 12 to the first output fiber 20.

Figure 2:
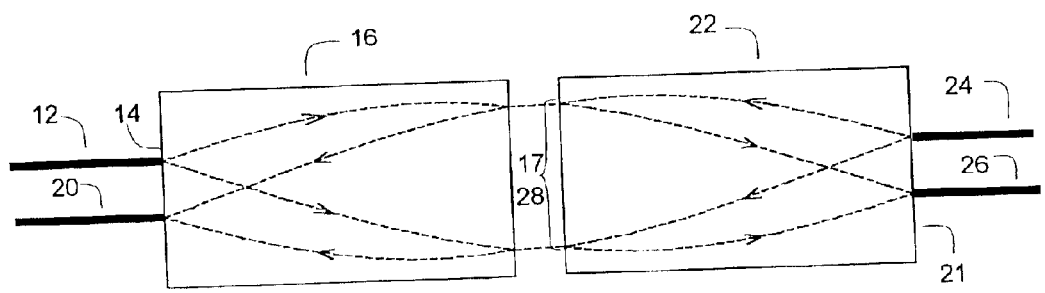
FIG. 2 illustrates an optical schematic of a prior art apparatus having a pair of fibers connected to a second pair of fibers with two collimating lenses.

Turning now to FIG. 2, illustrated is an optical schematic of a prior art apparatus having a pair of fibers connected to a second pair of fibers with two collimating lenses. Like FIG. 1, FIG. 2 is presented for the purpose of conveying basic optical principles of which the illustrated embodiment of the present invention takes advantage.

FIG. 2 shows the first input fiber 12, again providing a source of optical energy and terminating at the focal plane of the collimating lens 16. As before, the collimating lens 16 collimates the optical energy emanating from the first input fiber 12 into the collimated beam 17. However, in contrast to FIG. 1, the collimated beam 17 is projected instead into a second collimating lens 22. The second collimating lens 22 focuses the collimated beam 17 onto a second output fiber 26 that terminates at a focal plane of the second collimating lens 22. The second output fiber 26 serves as a receptor for the optical energy. By this process, the optical energy has been transferred from the first input fiber 12 to the second output fiber 26.

Opposing optical energy is introduced at a second input fiber 24 terminating at the focal plane of the second collimating lens 22. The second collimating lens 22 collimates the optical energy emanating from the second input fiber 24 into a beam 28. The collimated beam 28 is projected into the first collimating lens 16, which, in turn, focuses the energy onto the first output fiber 20. The first output fiber 20 serves as a receptor for the optical energy. By this process, the optical energy has been transferred from the second input fiber 24 to the first output fiber 20.

Figure 3:
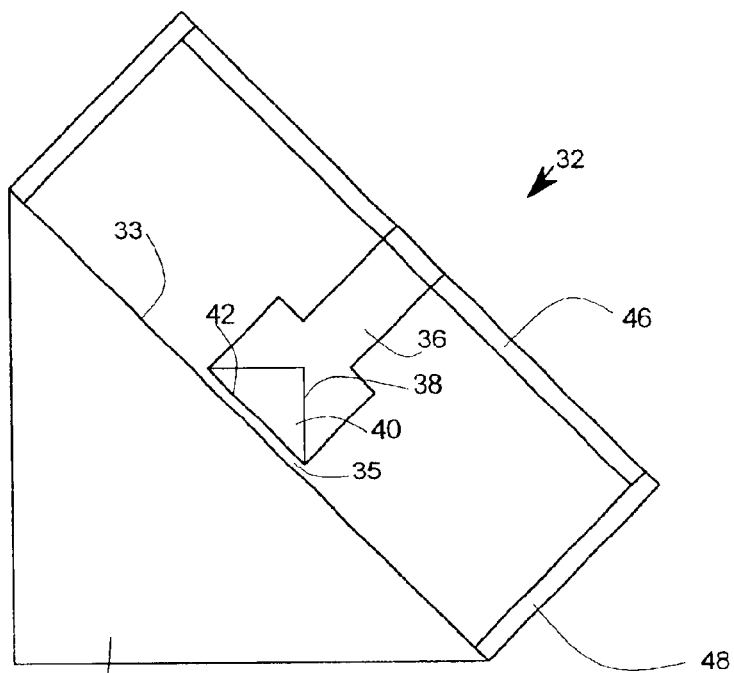
FIG. 3 illustrates a TIR optical switch constructed according to the principles of the present invention.

Turning now to FIG. 3, illustrated is a TIR optical switch, generally designated 32, constructed according to the principles of the present invention. The TIR optical switch 32 has a first spacer 48 and a second spacer 36 that cooperate to separate an actuator 46 from a frustrating refracting body 44. It is advantageous (and in the illustrated embodiment, important) that the first spacer 48 have essentially the same coefficient of expansion as the second spacer 36.

In the illustrated embodiment, the first and second spacers 48,36 are composed of glass or ceramic. The actuator 46 in the illustrated embodiment is a piezoelectric bimorph.

When an electrical impulse voltage is applied to the actuator 46, a center portion (not separately referenced, but adjoining the second spacer 36) of the actuator 46 is deflected toward the primary refracting body 44. In the preferred embodiment, the electrical impulse has a rapid rise time (less than 20 microseconds).

Deflection of the center portion of the actuator 46 may generate a shock wave (not shown) that travels through the second spacer 36 and drives a frustrating refracting body 40 toward the primary refracting body 44. If generated, the shock wave propagates through the frustrating refracting body 40, causing a frustrating surface 42 of the frustrating refracting body 40 to move from an initial position greater than one wavelength from a first total internal reflecting surface 33 of the primary refracting body 44 to a subsequent position less than $\frac{1}{10}^{th}$ of a wavelength from the first total internal reflecting surface 33.

By driving the frustrating refracting body 40 from its center, as opposed to its edge, the shock wave reaches the center of the frustrating refracting body 40 before, or at essentially the same time as, it reaches the edge of the frustrating refracting body 40. This orderly, outward progression of the shock wave essentially eliminates the indentation in the center of the frustrating refracting body 40 which, in the past, caused a transient deformation 35 at the center of the frustrating refracting body 40. Minimization or absence of the transient deformation minimizes or eliminates transient optical reflection after closing.

It is recognized that many different mechanical arrangements exist to facilitate the shock wave arriving at the center, and thus the motion first occurring at the center of the frustrating surface 42 of the frustrating refracting body 40 prior to reaching the edges of the frustrating surface 42 of the frustrating refracting body 40.

It should be noted that, in alternative embodiments, the actuator 46 drives the frustrating refracting body 40: (1) uniformly, at least substantially reducing any shock wave that may form or (2) at a lower velocity, again reducing or eliminating any shock waves. Thus, a shock wave is initiated only in the illustrated embodiment, and not in all embodiments of the present invention. Those skilled in the pertinent art will further recognize that many different mechanical arrangements exist to drive the frustrating refracting body 40 uniformly or at a lower velocity.

The body of the frustrating refracting body 40 is transparent, such that light can travel through it. A mirror 41 is located within the frustrating refracting body 40. The mirror 41 is formed of two flat mirror surfaces oriented essentially normal to the direction of the optical axes of the first and second collimating lenses 16, 22. In the illustrated embodiment, the mirror 41 is composed of enhanced silver, although those skilled in the pertinent art will realize that other materials fall within the broad scope of the present invention.

Figure 4:
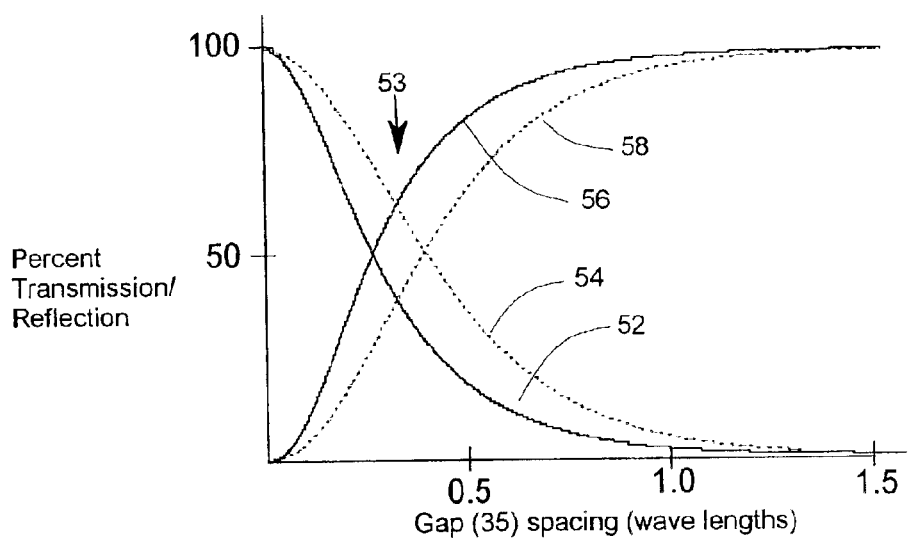
FIG. 4 illustrates a graphical representation of reflection and transmission at a TIR interface constructed according to the principles of the present invention as a function of spacing.

Turning now to FIG. 4, illustrated is a graphical representation of reflection and transmission at a TIR interface constructed according to the principles of the present invention as a function of spacing. Shown are curves corresponding to: (1) transmission of optical energy in the plane of incidence Tp (curve 52), (2) transmission of optical energy perpendicular to the plane of incidence Ts (curve 54), (3) reflection of optical energy in the plane of incidence Rp (curve 56) and (4) reflection of optical energy perpendicular to the plane of incidence Rs (curve 58).

FIG. 4 well illustrates how an air gap of $1/10^{th}$ of a wavelength or less yields substantial transmission and negligible reflection and how an air gap of more than a full wavelength yields negligible transmission and substantial reflection. FIG. 4 also illustrates an intermediate region 53 in which transmission and reflection occur more or less concurrently. The optical switch of the present invention can be driven to operate in this region as well, allowing multiple output light beams (of controllable relative intensity, no less) to be selectively spawned from a single input light beam.

Figure 5A:
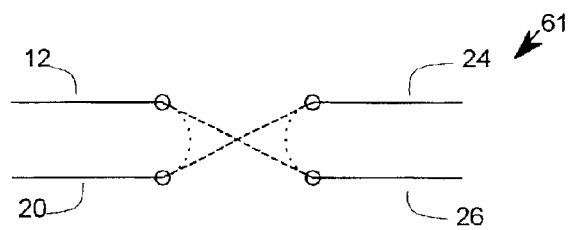
FIGS. 5A and 5B together illustrate optical schematics of the TIR reversing switch of FIGS. 3 and 7.
Figure 5B:
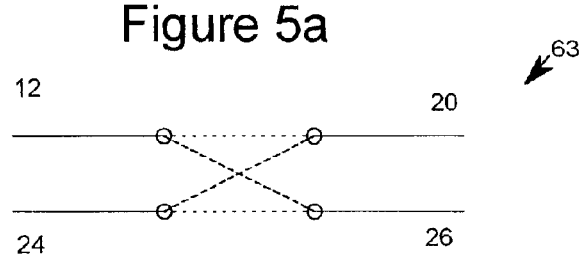

Turning concurrently now to FIGS. 5A and 5B, illustrated are optical schematics of the TIR reversing switch 32 of FIG. 3. The switch is illustrated in two configurations as a switch 61 and a switch 63, respectively.

Regarding FIG. 5A, optical energy is initially routed from the first input fiber 12 to the first output fiber 26. Optical energy is also initially routed from the opposing second fiber input 24 to the second fiber output 20. Upon actuation, optical energy is reversed, and instead routed from the first fiber input 12 to the second output fiber 20. Likewise, optical energy is instead routed from the second input fiber 24 to the first fiber output 26. The common name for this TIR reversing switch 61 is a 2×2 reversing bypass switch 61.

FIG. 5B illustrates the same switch, made to function as a 2×2 cross bar switch 63. Optical energy is initially routed from the first input fiber 12 to the first output fiber 26. Optical energy is also initially routed from the second input fiber 24 to the second output fiber 20. Upon actuation, optical energy is reversed and instead routed from the first fiber input 12 to the second output fiber 20. Likewise, optical energy is instead routed from the second input fiber 24 to the second fiber output 26.

Figure 6:
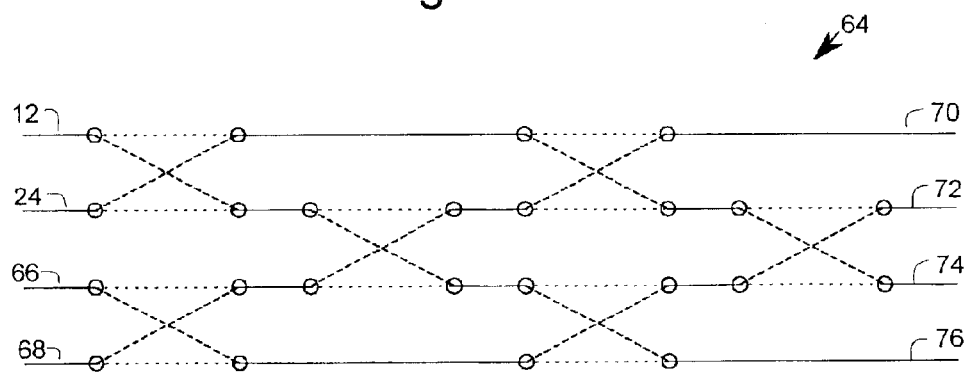
FIG. 6 illustrates an N×N cross bar switch composed of multiple TIR reversing switches and constructed according to the principles of the present invention.

Turning now to FIG. 6, illustrated is an N×N (specifically a 4×4) cross bar switch composed of multiple TIR reversing optical switches and constructed according to the principles of the present invention. FIG. 6 shows six TIR reversing optical switches (not separately referenced) configured as 2×2 cross bar switches to yield a 4×4 cross bar switch, generally referenced as 64. Each of several input fibers 12, 24, 66, 68 can be connected to any of several output fibers 70, 72, 74, 76. It is apparent that greater numbers of TIR reversing optical switches can be cascaded in like manner to form an optical switch of arbitrarily large (N×N) size.

Figure 7:
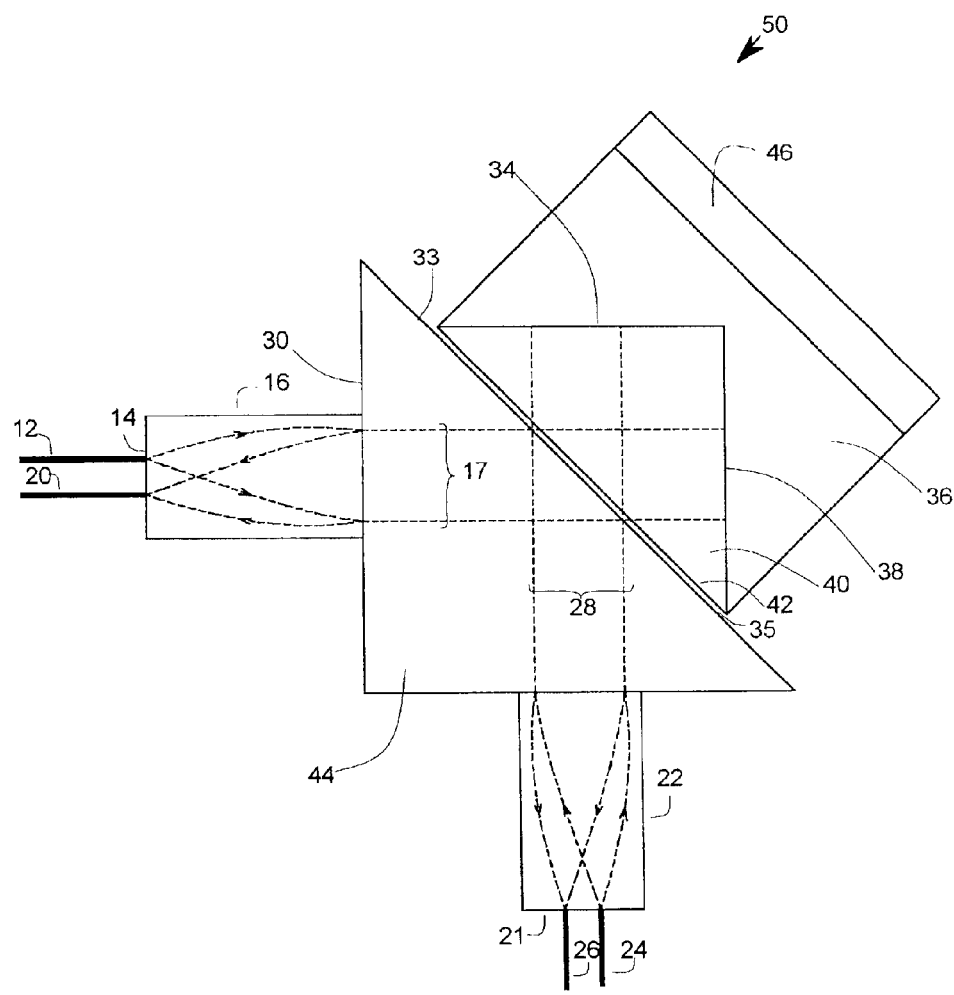
FIG. 7 illustrates a TIR reversing optical switch constructed according to the principles of the present invention.

FIG. 7 illustrates a TIR reversing optical switch, generally referenced as 50, constructed according to the principles of the present invention. FIG. 7 will be initially described assuming that the TIR reversing switch 50 is in an open state, the air gap 35 being perhaps on the order of one and a half wavelengths in thickness.

The first input fiber 12 provides a source of optical energy and terminates at the focal plane of the collimating lens 16. The collimating lens 16 collimates the optical energy emanating from the first input fiber 12 into a beam 17. By virtue of the physical phenomenon of total internal reflection, the collimated beam 17 is reflected off of the first total internal reflecting surface into a second collimating lens 22. The second collimating lens 22 focuses the collimated beam 17 onto a second output fiber 26 that terminates at a focal plane of the second collimating lens 22. The second output fiber 26 serves as a receptor for the optical energy. By this process, the optical energy has been transferred from the first input fiber 12 to the second output fiber 26.

Opposing optical energy is introduced at a second input fiber 24 terminating at the focal plane of the second collimating lens 22. The second collimating lens collimates the optical energy emanating from the second input fiber 24 into a beam 28. The collimated beam 28 is reflected off of the first total internal reflecting surface 33 into the first collimating lens 16, which, in turn, focuses the energy onto the first output fiber 20. The first output fiber 20 serves as a receptor for the optical energy. By this process, the optical energy has been transferred from the second input fiber 24 to the first output fiber 20.

Now FIG. 7 will be described assuming that the TIR reversing switch 50 is in a closed state, the air gap 35 being perhaps less than $1/10^{th}$ of a wavelength in thickness. The first input fiber 12 provides a source of optical energy and terminates at the focal plane of the first collimating lens 16 that collimates the optical energy emanating from the first input fiber 12 into a beam 17.

The air gap 35 having substantially closed and the reflection of the first total internal reflecting surface 33 having been frustrated, the collimated beam 17 passes through the interface defined by the first total internal reflecting surface 33 and the frustrating surface 42 of the frustrating refracting body 40. The collimated beam 17 then impinges upon and is reflected from a mirror 38 formed on or proximate the frustrating refracting body 40 (though not shown, the mirror 38 may be stood-off from a backside of the frustrating refracting body 40 without materially changing the beam-reversing function of the mirror 38). The collimated beam 17 then passes back through the interface defined by the first total internal reflecting surface 33 and the frustrating surface 42 and returns to the first collimating lens 16. The first collimating lens 16 focuses the optical energy onto the first output fiber 20. By this process, the optical energy has been transferred from the first input fiber 12 to the first output fiber 20.

In like fashion, the second input fiber 12 provides an opposing source of optical energy and terminates at the focal plane of the second collimating lens 22 that collimates the optical energy emanating from the second input fiber 24 into a collimated beam 28.

The air gap 35 again having substantially closed and the reflection of the first total internal reflecting surface 33 frustrated, the collimated beam 28 passes through the interface defined by the first total internal reflecting surface 33 and the frustrating surface 42 of the frustrating refracting body 40. The collimated beam 28 then impinges upon and is reflected from the mirror 38. The collimated beam 28 then passes back through the interface defined by the first total internal reflecting surface 33 and the frustrating surface 42 and returns to the second collimating lens 22. The first collimating lens 22 focuses the optical energy onto the second output fiber 26. By this process, the optical energy has been transferred from the second input fiber 24 to the second output fiber 26.

Figure 8:
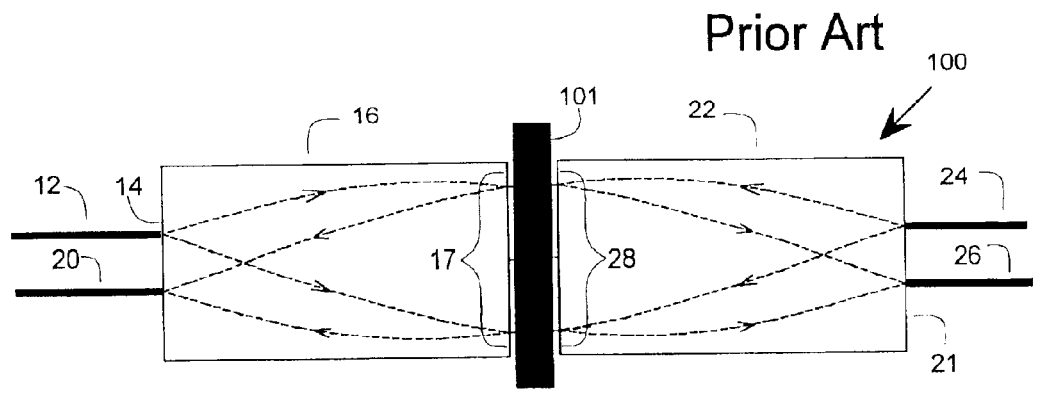
FIG. 8 illustrates an optical schematic of a prior art apparatus having two collimating lens with an optical filter inserted between to drop and add a single wavelength or group of wavelengths.

Turning now to FIG. 8, illustrated is an optical schematic of a prior art apparatus having two collimating lens with an optical filter inserted between to drop and add a single wavelength or group of wavelengths. FIG. 8 is presented for the purpose of conveying basic optical principles of which the illustrated embodiment of the present invention takes advantage and can be found as FIG. 10.11 on page 381 of W. J. Tomlinson, "Optical Fiber Telecommunication II."

A first input fiber 12 provides a source of multiple wavelength optical energy and terminates at a focal plane of a first collimating lens 16 that collimates the optical energy emanating from the first input fiber into a collimated beam 17. The first collimating lens 16 is illustrated as being a GRIN lens.

The collimated beam 17 impinges upon an optical filter 101, that is predominantly reflective at some wavelengths and predominantly transmissive at one or more wavelengths. Some of the wavelengths, $\lambda_1 \ldots \lambda_n-\lambda_m$, of the collimated beam 17, are reflected at the filter 101 at mutually dependent angles and returned to the first collimating lens 16. The first collimating lens 16 focuses the optical energy $\lambda_1 \ldots \lambda_n-\lambda_m$ onto a first output fiber 26 terminating at the focal plane of the first collimating lens 16. At the same time $\lambda_m$ is transmitted through the filter 101 and is focused by the lens 22 into the first output fiber 20. This effectively drops $\lambda_m$.

$\lambda_m'$, the add wavelength, is inserted at an add fiber 24 and collimated by a lens 22. The collimated beam 28 of $\lambda_m'$ is transmitted to the output fiber 20. Any other wavelengths from the add fiber 24 are reflected by the filter 101 to the fiber 26. By this process, $\lambda_m$ has been separated from $\lambda_1 \ldots \lambda_n$ and dropped and $\lambda_m'$ has been added to $\lambda_1 \ldots \lambda_n$ at the output fiber 20.

Figure 9:
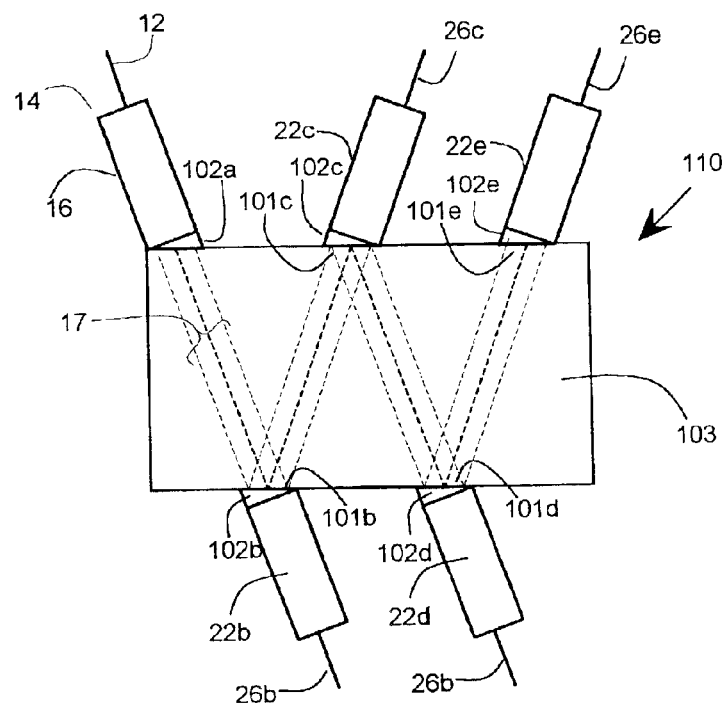
FIG. 9 illustrates an optical schematic of a prior art apparatus having multiple filters inserted between multiple collimating lens to drop multiple wavelengths.
Figure 10:
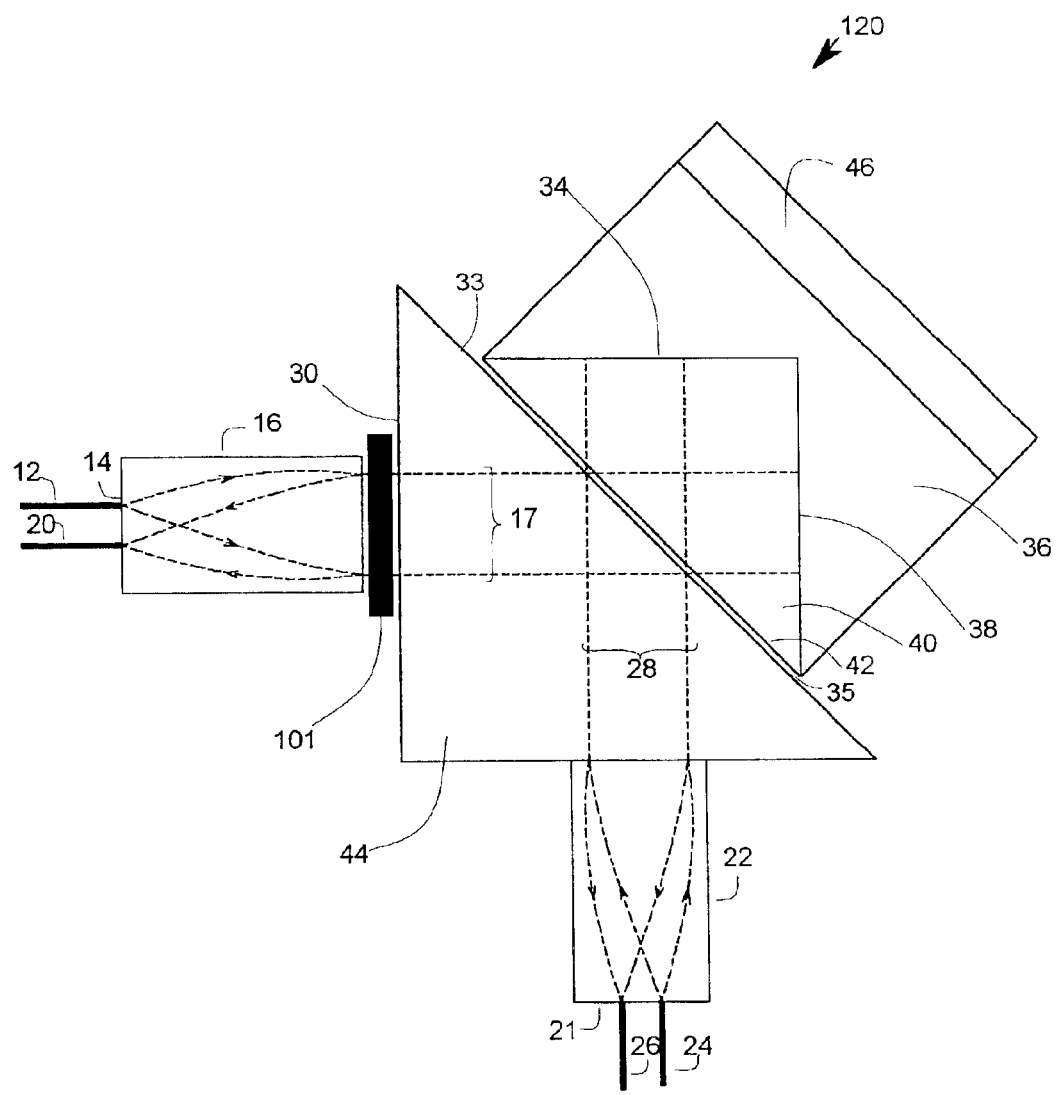
FIG. 10 illustrates filter integrated with an FTIR optical switch, resulting in a remotely configurable add/drop constructed according to the principles of the present invention.

Turning now to FIG. 9, illustrated is an optical schematic of a prior art apparatus having four filters inserted between multiple collimating lens to drop four wavelengths and can be found as FIG. 10.14 on page 384 of "Optical Fiber Telecommunication II." As FIG. 8, FIG. 9 is presented for the purpose of conveying basic optical principles of which the illustrated embodiment of the present invention takes advantage.

FIG. 9 shows the first input fiber 12, again providing a source of optical energy with multiple wavelengths $\lambda_1 \ldots \lambda_n$ and terminating at the focal plane of the collimating lens 16. As before, the collimating lens 16 collimates the optical energy emanating from the first input fiber 12 into the collimated beam 17 and projects it onto an optical filter 101b. However, in contrast to FIG. 8, the collimated beam 17 is reflected onto filters 101c, 101d, 101e. As in FIG. 8, $\lambda_b$ is transmitted into a lens 22b and focused onto and dropped at a fiber 26b. $\lambda_1 \ldots \lambda_n-\lambda_b$ is then reflected to an optical filter 101c, where $\lambda_c$ is transmitted into a lens 22c and focused onto and dropped at a fiber 26c. $\lambda_1 \ldots \lambda_n-\lambda_b-\lambda_c$ is then reflected to an optical filter 101d, where $\lambda_d$ is transmitted into a lens 22d and focused onto and dropped at a fiber 26d. $\lambda_1 \ldots \lambda_n-\lambda_b-\lambda_c-\lambda_d$ is then reflected to an optical filter 101e, where $\lambda_e$ is transmitted into a lens 22e and focused onto and dropped at a fiber 26e. One skilled in the pertinent art would find it apparent that the collimated beam 17 can be cascaded to any number of filters. Furthermore, these filters 101b, 101c, 101d, 101e, can be bandpass, comb, longpass or shortpass filters.

Turning now to FIG. 10, illustrated is a single channel integrated optical add/drop multiplexer generally designated 120 and constructed according to the principles of the present invention. The single channel integrated optical add/drop multiplexer 120 introduces an optical filter 101 between the collimating lens 16 the first refracting element 44 of an FTIR reversing optical switch 50 as described in the application of which this is a continuation-in-part.

FIG. 10 will be initially described assuming that the FTIR reversing switch 50 is in an open state, the air gap 35 being perhaps on the order of one wavelength in thickness. The first input fiber 12 provides a source of optical energy containing multiple wavelengths $\lambda_1 \ldots \lambda_n$ and terminates at the focal plane of the collimating lens 16. The collimating lens 16 collimates the optical energy emanating from the first input fiber 12 into a beam 17. The collimated beam 17 impinges upon the filter 101, where $\lambda_1 \ldots \lambda_n-\lambda_m$ is reflected and focused by the lens 16 to the output fiber 20.

Simultaneously, $\lambda_m$ is transmitted through the filter 101 into the first refracting element 44. By virtue of the physical phenomenon of total internal reflection, the collimated beam 17 containing $\lambda_m$ is reflected off of the first reflecting surface into a second collimating lens 22. The second collimating lens 22 focuses the collimated beam 17 containing $\lambda_m$ onto a second output (drop) fiber 26 that terminates at a focal plane of the second collimating lens 22. The second output fiber 20 serves as a drop for the optical energy of $\lambda_m$. By this process, $\lambda_m$ has been dropped from $\lambda_1 \ldots \lambda_n$ the first output fiber 20 to the second output (drop) fiber 26.

Opposing optical energy, the add channel containing $\lambda_m'$ is introduced at a second input (add) fiber 24 terminating at the focal plane of the second collimating lens 22. The second collimating lens collimates the optical energy emanating from the second input (add) fiber 24 into a beam 28. The collimated beam 28 is reflected off of the first reflecting surface 33 into the filter 101. The filter 101 reflects all wavelengths other than $\lambda_m'$ back to the fiber 26. Filter 101 simultaneously transmits $\lambda_m'$ to the first collimating lens 16, which, in turn, focuses the energy onto the first output fiber 20. The first output fiber 20 serves as a sink for the optical energy. By this process, the optical energy $\lambda_1 \ldots \lambda_n$ has been transferred from the first input fiber 12 to the first output fiber 20 and has dropped $\lambda_m$ at the drop fiber 26 and added $\lambda_m'$ from the add fiber 24. This results in $\lambda_1 \ldots \lambda_n-\lambda_m+\lambda_m'$ at the output fiber 20.

Now FIG. 10 will be described assuming that the FTIR reversing switch 50 is in a closed state, the air gap 35 being perhaps on the order of ⅒$^{th}$ of a wavelength in thickness. The first input fiber 12 provides a source of optical energy containing multiple wavelengths $\lambda_1 \ldots \lambda_n$ and terminates at the focal plane of the collimating lens 16. The collimating lens 16 collimates the optical energy emanating from the first input fiber 12 into a beam 17. The collimated beam 17 impinges upon filter 101, where $\lambda_1 \ldots \lambda_n$–$\lambda_m$ is reflected and focused by lens 16 to output fiber 20.

Simultaneously, $\lambda_m$ is transmitted into the first refracting element 44. The air gap 35 having substantially closed and the reflection of the first reflecting surface 33 having been frustrated, the collimated beam 17 passes through the interface defined by the first reflecting surface 33 and the frustrating surface 42 of the frustrating refracting body 40. The collimated beam 17 then impinges upon and is reflected from an angled mirror 38 formed within or on the frustrating refracting body 40. The collimated beam 17 then passes back through the interface defined by the first reflecting surface 33 and the frustrating surface 42 and returns to the filter 101 and then to the first collimating lens 16. The first collimating lens 16 focuses the optical energy onto the first output fiber 20. By this process, the optical energy containing multiple wavelengths $\lambda_1 \ldots \lambda_n$ has been transferred from the first input fiber 12 to the first output fiber 20, without adding $\lambda_m'$ or dropping $\lambda_m$.

In like fashion, the second input (add) fiber 24 provides an opposing source of optical energy $\lambda_m'$ and terminates at the focal plane of the second collimating lens 22 that collimates the optical energy emanating from the second input fiber 24 into the collimated beam 28.

The air gap 35 again having substantially closed and the reflection of the first reflecting surface 33 frustrated, the collimated beam 28 passes through the interface defined by the first reflecting surface 33 and the frustrating surface 42 of the frustrating refracting body 40. The collimated beam 28 then impinges upon and is reflected from the angled mirror 38. The collimated beam 28 then passes back through the interface defined by the first reflecting surface 33 and the frustrating surface 42 and returns to the second collimating lens 22. The first collimating lens 22 focuses the optical energy $\lambda_m'$ onto the second output (drop) fiber 26. By this process, the optical energy $\lambda_m'$ has been transferred from the second input (add) fiber 24 to the second output (drop) fiber 26.

It will be recognized by those skilled in the art that $\lambda_m$ and $\lambda_m'$ can be replaced by a series of wavelengths $\lambda_1 \ldots \lambda_n$ and $\lambda_1' \ldots \lambda_n'$ and that the filters can be bandpass, comb, longpass or shortpass filters. It is therefore apparent that the present invention provides a means of remotely configuring an add and drop filter such that $\lambda_m$ is dropped and $\lambda_m'$ is added or, alternatively, nothing is added or dropped.

Those skilled in the art will readily see that the fibers 12, 20 can be interchanged as the input and output fibers (requiring, of course, the fibers 24, 26 to be interchanged as the add and drop fibers). Alternatively, the fibers 24, 26 could function as the input and output fibers (in which case the fibers 12, 20 would be the add and drop fibers).

Figure 11:
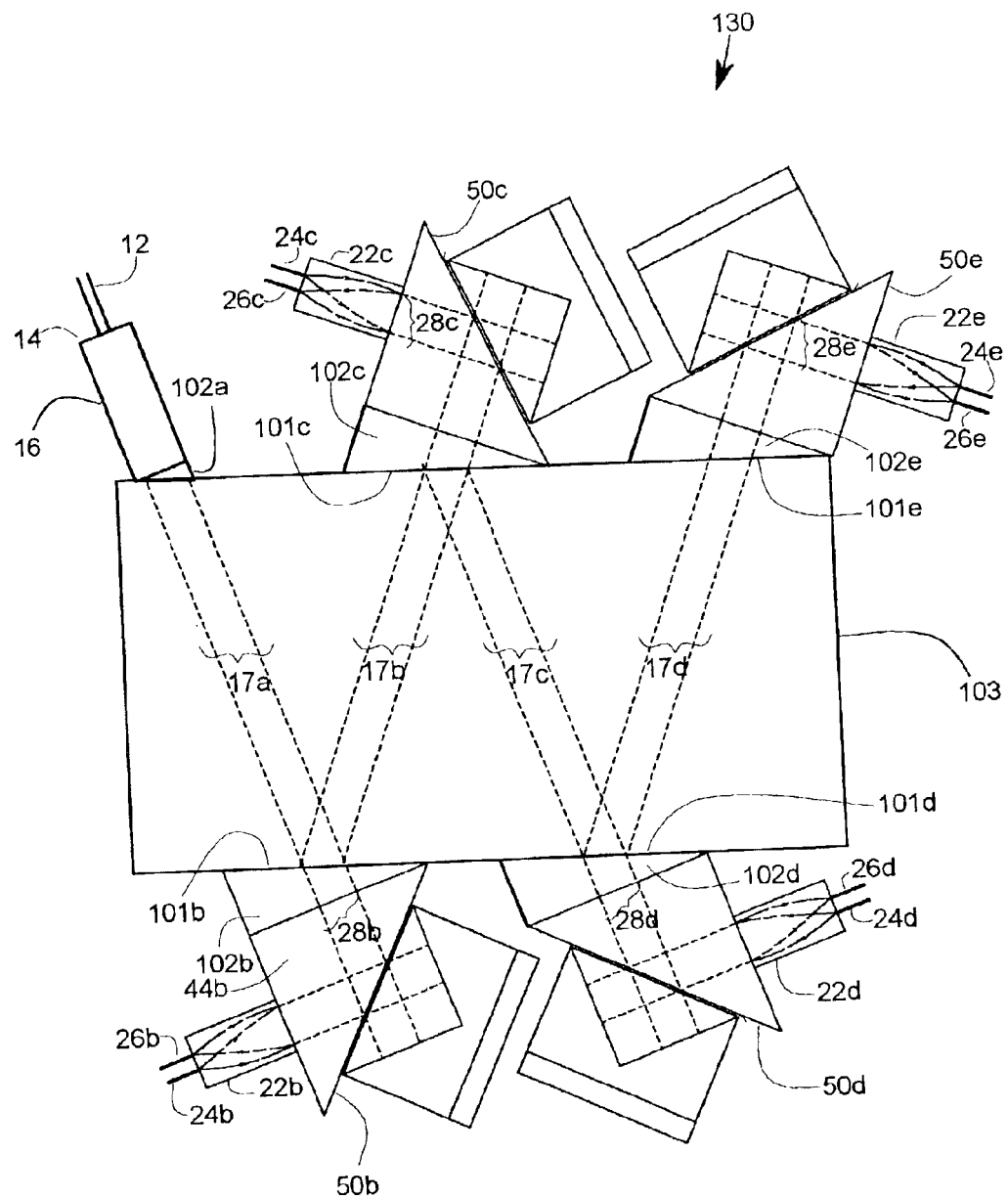
FIG. 11 illustrates multiple filters integrated with multiple FTIR switches, resulting in an integrated channel add/drop multiplexer constructed according to the principles of the present invention.

Turning now to FIG. 11, illustrated is a four channel integrated add/drop multiplexer generally designated 130 and constructed according to the principles of the present invention. The four channel integrated add/drop multiplexer 130 is built about a refracting element 103 and provides optical filters 101b, 101c, 101d, 101e between the collimating lens 16 and the first refracting element 44 of the FTIR reversing optical switches 50b, 50c, 50d, 50e. FIG. 11 will be initially described assuming that the FTIR reversing switch 50b is in an open state, the air gap 35 being perhaps on the order of one wavelength in thickness.

The first input fiber 12 provides a source of optical energy containing multiple wavelengths $\lambda_1 \ldots \lambda_n$ and terminates at the focal plane of the collimating lens 16. The collimating lens 16 collimates the optical energy emanating from the first input fiber 12 into a beam 17a. The collimated beam 17a impinges upon the filter 101b, where the collimated beam 17b containing $\lambda_1 \ldots \lambda_n$–$\lambda_b$ is reflected to the filter 101c. Simultaneously $\lambda_b$ is transmitted into the refracting element 44. By virtue of the physical phenomenon of total internal reflection, the collimated beam 17a containing $\lambda_b$ is reflected off of the first reflecting surface into a second collimating lens 22b. The second collimating lens 22b focuses the collimated beam 17 containing $\lambda_b$ onto a second output (drop) fiber 26b that terminates at a focal plane of the second collimating lens 22. The second output fiber 20b serves as a drop for the optical energy of $\lambda_b$. By this process, $\lambda_b$ has been dropped from $\lambda_1 \ldots \lambda_n$ the first output fiber 20 to the second output (drop) fiber 26.

The add channel, containing $\lambda_b'$, is introduced at a second input (add) fiber 24b terminating at the focal plane of the second collimating lens 22b. The second collimating lens collimates the optical energy emanating from the second input (add) fiber 24 into a beam 28. The collimated beam 28 is reflected off of the first reflecting surface 33 into the filter 101. The filter 101 reflects all wavelengths other than $\lambda_b'$ back to the fiber 26. The filter 101 simultaneously transmits $\lambda_b'$ to first collimating lens 16, which, in turn, focuses the energy into the first output fiber 20.

Now FIG. 11 will be described assuming that the FTIR reversing switch 50b is in a closed state, the air gap 35 being perhaps on the order of ⅒$^{th}$ of a wavelength in thickness. The first input fiber 12 provides a source of optical energy containing multiple wavelengths $\lambda_1 \ldots \lambda_n$ and terminates at the focal plane of the collimating lens 16. The collimating lens 16 collimates the optical energy emanating from the first input fiber 12 into a beam 17a. The collimated beam 17a containing $\lambda_1 \ldots \lambda_n$ impinges upon filter 101b, where $\lambda_1 \ldots \lambda_n$–$\lambda_b$ is reflected to filter 101c. Simultaneously $\lambda_b$ is transmitted into the first refracting element 44. The air gap 35 having substantially closed and the reflection of the first reflecting surface 33 having been frustrated, the collimated beam 17 passes through the interface defined by the first reflecting surface 33 and the frustrating surface 42 of the frustrating refracting body 40. The collimated beam 17 then impinges upon and is reflected from an angled mirror 38 formed within or on the frustrating refracting body 40. The collimated beam 17 then passes back through the interface defined by the first reflecting surface 33 and the frustrating surface 42 and returns to the filter 101 and then to the first collimating lens 16. The first collimating lens 16 focuses the optical energy into the first output fiber 20.

In like fashion, the second input (add) fiber 24 provides an opposing source of optical energy $\lambda_b'$ and terminates at the focal plane of the second collimating lens 22 that collimates the optical energy emanating from the second input fiber 24 into the collimated beam 28b.

The air gap 35 again having substantially closed and the reflection of the first reflecting surface 33 frustrated, the collimated beam 28b passes through the interface defined by the first reflecting surface 33b and the frustrating surface 42b of the frustrating refracting body 40. The collimated beam 28b then impinges upon and is reflected from the angled mirror 38b. The collimated beam 28b then passes back through the interface defined by the first reflecting surface 33b and the frustrating surface 42b and returns to the second collimating lens 22b. The second collimating lens 22b focuses the optical energy $\lambda_m'$ onto the second output (drop) fiber 26b. By this process, the optical energy $\lambda_b'$ has been transferred from the second input (add) fiber 24b to the second output (drop) fiber 26b. The process described above is repeated in the same manner at the switch 50c, the filter 101c, the switch 50d, the filter 101d, the switch 50e and the filter 101e with $\lambda_c'$, $\lambda_d'$ and $\lambda_e'$ being added and $\lambda_c$, $\lambda_d$ and $\lambda_e$ being dropped at filters 101c, 101d, 101e respectively.

One skilled in the pertinent art will recognize that this process can be repeated with additional filters and switches. He will also recognize that a last filter 101m can be replaced with a mirror to return any remaining wavelengths to the output fiber 20, that $\lambda'$ can be replaced by a series of wavelengths $\lambda_1' \ldots \lambda_n'$ and that the filters can be bandpass, comb, longpass or shortpass filters.

It is therefore apparent that the present invention provides a means to remotely configure an add and drop filter such that $\lambda_b$, $\lambda_c$, $\lambda_d$ and $\lambda_e$ are dropped and $\lambda_b'$, $\lambda_c'$, $\lambda_d'$ and $\lambda_e'$ are added or, in the alternative, that any combination of wavelengths can be selectively added or dropped.

Figure 12:
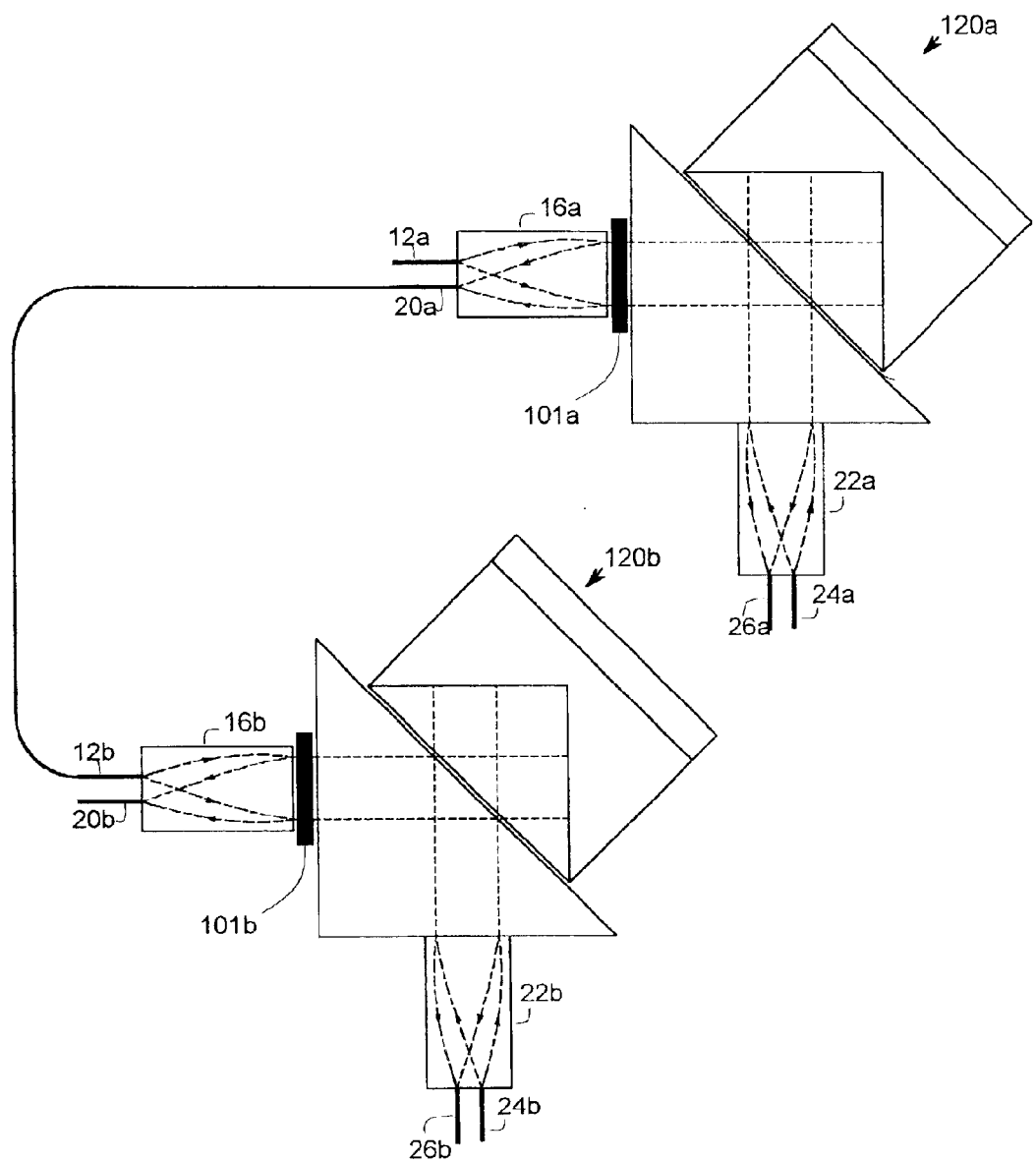
FIG. 12 illustrates multiple add/drops cascaded for adding and dropping multiple wavelengths constructed according to the principles of the present invention.

Turning now to FIG. 12, illustrated is a cascaded single channel integrated optical add/drop multiplexer that includes first and second add/drops designated 120a, 120b, respectively, constructed according to the principles of the present invention. Each individual add/drop 120a, 120b has been described above. The add/drop 120a selectively adds $\lambda_m'$ and drops $\lambda_m$. By cascading the add/drop 120b with the add/drop 120a, the add/drop 120b thereafter selectively adds $\lambda_1'$ and drops $\lambda_1$. Those skilled in the art will readily see that $\lambda'$ can be replaced by a series of wavelengths $\lambda_1' \ldots \lambda_n'$ and that the filters can be bandpass, comb, longpass or shortpass filters.

It is thus apparent that the present invention provides a means to remotely configure an add and drop filter such that $\lambda_1$ and $\lambda_m$ are dropped and $\lambda_1'$ and $\lambda_m'$ are added. Alternatively, nothing is added or dropped, or any combination of wavelengths is added or dropped. Those skilled in the pertinent art will also recognize that any number of add/drops 120 can be cascaded to provide the option of adding and dropping any number of wavelengths $\lambda_m$. It should also be apparent that the multiplexer can be alternatively constructed in a hierarchical fashion, wherein bands of wavelengths are successively subdivided into channels by successive add/drops arranged as are branches in a tree.

From the above, it is apparent that the present invention introduces novel architectures of integrated optical add/drop wavelength division multiplexers and FTIR switches. In one embodiment, an add/drop includes: (1) a primary refracting body having a total internal reflecting surface and capable of transmitting optical energy therethrough, (2) a frustrating refracting body having a frustrating surface located proximate the total internal reflecting surface, (3) an actuator, coupled to the primary refracting body and the frustrating refracting body, that drives at least a center portion of the frustrating refracting body thereby to frustrate a reflection of the total internal reflecting surface and (4) an optical filter, optically aligned with the primary refracting body, that configurably passes selected wavelengths of light through the primary refracting body and reflects remaining wavelengths.

Although the present invention has been described in detail, those skilled in the art should understand that they can make various changes, substitutions and alterations herein without departing from the spirit and scope of the invention in its broadest form.

What is claimed is:

1. A remotely configurable add/drop for a WDM optical network, comprising:
    a primary refracting body having a total internal reflecting surface and capable of transmitting optical energy therethrough;
    an optical filter, optically aligned with a first surface of said primary refracting body, that configurably passes selected wavelengths of light through said primary refracting body and reflects remaining wavelengths;
    a first collimating lens optically aligned with a surface of said optical filter;
    a second collimating lenses coupled to a second surface of said primary refracting body;
    a frustrating refracting body located proximate said total internal reflecting surface and having a mirror; and
    an actuator, coupled to said primary refracting body and said frustrating refracting body, that drives said frustrating refracting body between an open state, in which said add/drop processes said selected wavelengths, and a closed state, in which said add/drop leaves said selected wavelengths substantially intact.

2. The add/drop as recited in claim 1 wherein said optical filter is coupled to said primary refracting body.

3. The add/drop as recited in claim 1 wherein said optical filter is composed of a dielectric material.

4. The add/drop as recited in claim 1 wherein said actuator drives said frustrating refracting body from said open state to said closed state.

5. The add/drop as recited in claim 1 further comprising:
    a first input fiber and a first output fiber coupled to said first collimating lens; and
    a second input fiber and a second output fiber coupled to said second collimating lens.

6. The add/drop as recited in claim 1 wherein said primary refracting body is composed of glass.

7. The add/drop as recited in claim 1 wherein said frustrating refracting body is composed of glass.

8. The add/drop as recited in claim 1 wherein said actuator is composed of a piezoelectric bimorph.

9. The add/drop as recited in claim 1 wherein said mirror is composed of enhanced silver.

10. The add/drop as recited in claim 1 wherein said actuator drives said frustrating refracting body to an intermediate state in which a collimated beam emanating from said first collimating lens partially reflects off said total internal reflecting surface and travels toward said second collimating lens and partially reflects off said mirror and travels back toward said first collimating lens.

* * * * *